May 19, 1953　　M. L. STUDEBAKER ET AL　　2,638,625
APPARATUS FOR PELLETING CARBON BLACK
Filed June 14, 1948　　　　　　　　　　　　　　2 Sheets-Sheet 2

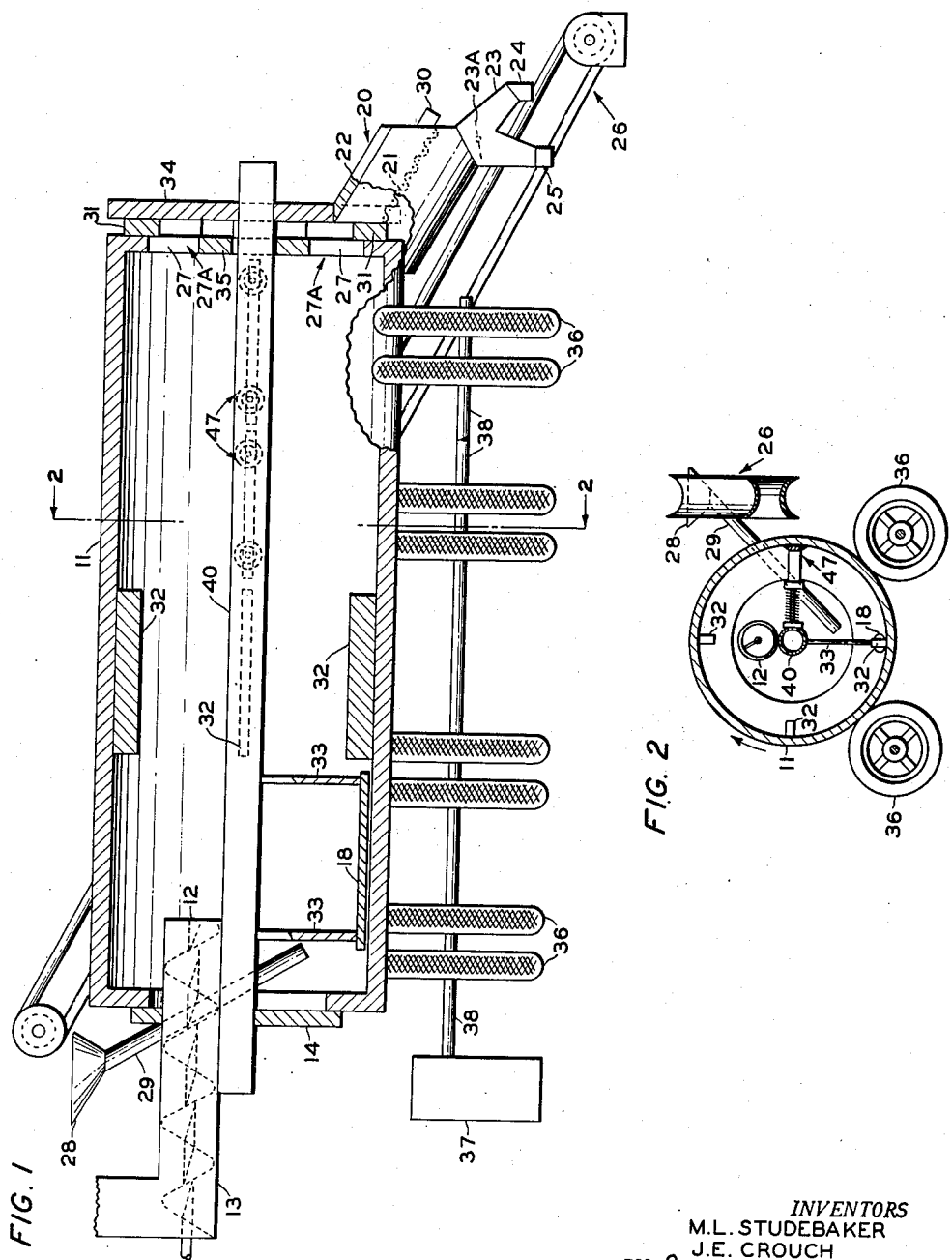

*INVENTORS*
M. L. STUDEBAKER
J. E. CROUCH
BY Hudson & Young
*ATTORNEYS*

Patented May 19, 1953

2,638,625

UNITED STATES PATENT OFFICE 2,638,625

APPARATUS FOR PELLETING CARBON BLACK

Merton L. Studebaker, Bartlesville, Okla., and John E. Crouch, Borger, Tex., assignors to Phillips Petroleum Company, a corporation of Delaware Application June 14, 1948, Serial No. 32,804

2 Claims. (Cl. 18—1)

This invention relates to the pelleting of carbon black. In a more specific aspect it relates to improvements in the dry process pelleting of carbon black. In a still more specific aspect it relates to the pelleting of chain structure carbon blacks such as the high modulus furnace blacks.

The carbon black industry has for many years produced carbon black by the incomplete combustion of natural gas and other similar light hydrocarbon feed stocks. This carbon black was known generally as channel black and was produced by the well known channel process. This channel black has been referred to as hard processing or medium processing black, and sometimes as just hard black. A modified form of channel black is referred to as easy processing channel black. Prior to 1940 this type of black amounted to about 90% of total carbon black produced in the United States. The carbon black produced by the channel process and its numerous modifications could be readily formed into substantially dustless granules or pellets by numerous processes well known to the art. This fine particle type of carbon black was exceptionally well suited for incorporation with natural crude rubber in compounding.

With the development of synthetic rubber such as GR–S it was found that for some purposes the fine particle channel black was unsatisfactory for compounding because of its hard processing and high heat build-up characteristics. The original channel process was modified slightly to produce a modified product sometimes called easy process channel black which, however, was not completely satisfactory for compounding in GR–S.

In order to produce satisfactory synthetic rubber for some purposes such as mechanical goods, extruded products, etc., it was found necessary to develop a new type of carbon black now referred to as high modulus furnace (HMF) black which is generally referred to as a "chain structure" type of carbon black. This type of carbon black exhibits a very strong tendency to agglomerate, under certain conditions the agglomeration takes the form of chains which can be seen with the electron microscope. This agglomeration is maintained when the black is dispersed in a rubber compound as contrasted to the individual particle type channel blacks which disperse more nearly completely as single discrete particles.

We use the terms chain-like grouping, chain structure or just "structure" carbon black to refer to the high modulus furnace blacks which are characterized by carbon black particles or groupings having a chain-like structure.

Chain structure carbon black is not easily pelletized by the well known processes used for pelleting the particle type channel black. The apparent commercial failure of the known pelleting processes may be due to a surface condition of the carbon black particles which condition is inherent in chain structure carbons. There does not appear to be any rigid theoretical explanation of the phenomenon. In any event, it has been found desirable to develop a new process for the pelleting of structure carbons.

The pelleting of carbon black made by the channel process is relatively simple. For the most part, all that is necessary is to introduce the black into one end of a revolving drum in which there are some pellets and to remove pelleted black from the other end. Pellets of about the optimum size and resistance to breakage to withstand bulk shipment are produced.

The pelleting of chain structure blacks, however, presents an entirely different problem. Such blacks are very "sticky" and adhere to surfaces very readily. These surfaces may be like or different surfaces, that is, the black may adhere to a metal, wood or other object or may cohere to other carbon black particles. When two unlike particles are held in mutual contact this attraction is spoken of as being due to adhesion while if two like particles are attracted by and retained in mutual contact this attraction is referred to as being due to cohesion. Chain structure carbon black possesses extraordinarily great cohesive properties, in fact, in pelleting operations, chain structure blacks tend to a marked extent to "over pellet" and yield pellets or balls so large that they cannot be handled without breaking. And once this black is pelleted or balled and broken, it is easily reduced to dust which complicates the pelleting process since, in effect, additional unpelleted black is present in the mill and the process is required to pellet ever increasing quantities of black. And further, the reason for the tendency of chain structure black to ball or to form oversized and unstable pellets is not known but is also believed to be related to the surface properties of the black.

In the dry process pelleting of carbon black, pellets are formed by tumbling a bed of pellets in a horizontal drum and simultaneously adding loose black to the tumbling bed. The bed of pellets flows in remarkably uniform manner quite like water. Under a given set of conditions comprising mill design, mill speed, bed depth, loose black feed rate, pellet recycle rate, etc., an equilibrium is established. This equilibrium might be defined as a dynamic condition at which the rate of pellet growth is equal to the rate of pellet breakage. Pellets increase in size due to the particle-to-particle attraction of carbon black particles. The shearing forces produced by the revolving mill result in some breakage of the pellets which offsets the pellet growth. Our invention provides a process in which the above equilibrium is disturbed in favor of increased pellet breakage with the resulting product pellets being reduced in size. This equilibrium must be disturbed in a carefully controlled manner or otherwise the pellet bed will be reduced to powder or dust. Practically any procedure for disrupting the regular flow of pellets in the bed will cause increased breakage. Some mechanical devices produce too much impact and consequently do not uniformly reduce the size of the pellets. Such devices yield a product with a wide range of pellet sizes with a high percentage of fractured pellets and dust.

We have found that longitudinal vanes on the walls of a mill will effectively reduce the size of the product pellets. In an actual test the size (diameter) of the product pellets was approximately 50 per cent of the size of pellets produced without our invention. The size of the pellets can be controlled by the size, length, design and number of the vanes or other bed disturbing means employed.

Our invention resides broadly in a method for making carbon black pellets of a predetermined average size and the results are achieved by disturbing to a definite and controllable degree the equilibrium of a bed of chain structure carbon black undergoing pelleting. In a bed of carbon black pellets in a rotating pelleting drum there is a certain amount of breakage. Pellets once broken may be broken further or literally pulverized or reduced to dust, or, if flocculent black is added, these fragments of pellets may serve as nuclei for the formation of new pellets.

An equilibrium condition exists in a bed of carbon black in a rotating pellet mill when an amount of pellets equal in weight to the amount of flocculent black added in unit time is withdrawn from the mill. The pellets withdrawn will possess a definite and uniform average size.

If the rotational speed of a mill operating on chain structure black exceeds a definite value breakage of pellets will be excessive and the broken pellets are quickly pulverized to flocculent and dusty carbon black having about the same particle size as the original raw flocculent black. Heavy or even relatively light weight rollers inserted into a bed of black undergoing pelleting exert the same influence as too great mill speed, that is, the pellet bed is soon pulverized and pellets will not form.

Chain structure carbon black undergoing pelleting is, indeed, very sensitive to mechanical disturbances. Conventional and well known pelleting processes when applied to chain structure carbon black produce either too large pellets or dust. When comparing pellets of identical hardness, large size pellets are inherently weak, are easily broken and, of course, cannot be shipped in bulk, while small size pellets are sufficiently strong as to permit shipment in specially constructed tank cars.

We have discovered a method for pelleting chain structure carbon blacks in which we are able to control the size of the pellets. We are further able to produce pellets of an optimum size and of sufficient hardness to withstand bulk shipment with a minimum of breakage.

One object of our invention is to provide a process for pelleting chain structure carbon blacks.

Another object of our invention is to devise a process for pelleting chain structure carbon blacks in which the operation can be so controlled so as to produce pellets of a predetermined average size.

Still another object of our invention is to provide a process for pelleting chain structure carbon blacks in which pellets of a predetermined average size are produced and are sufficiently small to resist breakage.

Yet another object of our invention is to provide such a process for pelleting chain structure carbon blacks which yields not only pellets of a predetermined size but pellets of sufficient hardness to withstand bulk handling and shipment.

Still other objects and advantages of our invention will be apparent to those skilled in the art upon inspection of the specification and drawing which respectively describes and illustrates a preferred embodiment of our invention.

In the drawings:

Figure 1 is an elevational view of a carbon black pelleting apparatus embodying the present invention, with parts broken away and in section to show details of construction.

Figure 2 is a cross sectional view of the apparatus shown in Figure 1 and taken on the line 2—2 of the same looking in the direction indicated.

Figure 3:
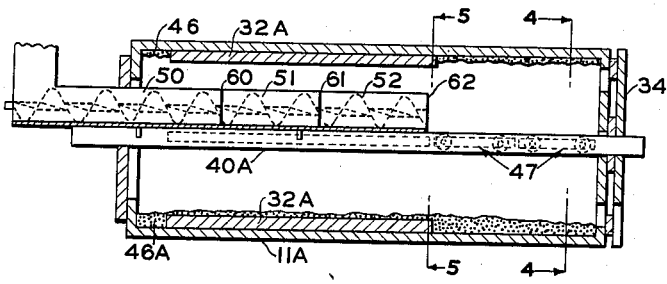
Figure 3 is an elevational view of another carbon black pelleting apparatus embodying the present invention, with parts broken away and in section to show details of construction.

Referring now to the drawing, our apparatus of Figure 1 is composed of an elongated cylindrical drum 11 which may be mounted or supported on rubber tired wheels 36. Any number of these wheels may be used for drum supporting purposes, the number of course will depend on the size of the drum and its load of carbon black. These wheels 36 may be mounted on a shaft 38 which is rotated by a source of power 37. There will, of course, be two sets of wheels 36, as may be seen in Figure 2. However, only one set of the wheels 36 and their supporting shaft 38 need be attached to the source of power for rotation of the pelleting drum. One particular pelleting drum which we have made and used was 20 inches in diameter and 99 inches in length. This drum was equipped with four vanes or fins 32 which were rigidly attached to the inside surface of the drum and centrally positioned with respect to the length thereof. These fins were welded in place and the long axis or length of the vanes was parallel to the longitudinal axis of the drum. The width or intermediate dimension of the vanes was positioned radially. This construction or rather positioning of the vanes may be seen in Figures 1 and 2. These particular vanes were 24 inches in length and about 2 inches in width.

In the upstream end of the pellet mill of Figure 1 was installed a rod 18 supported at the end of two short arms 33, which arms in turn were supported by a long tubular member 40. A tubular member 40 was concentric with the longitudinal axis of the drum 11. The tube is for supporting purposes only and as mentioned supports the two arms 33 and it also supports the end of a carbon black feeding apparatus 13. This carbon black feeding apparatus may be any type of feeding apparatus desired and it may be, for example, a belt conveyor or a screw conveyor. We have found that the conveyor 13 may well be a screw conveyor having its discharge end 12 fully open. The tube 40 also supports several scraper assemblies 47.

Figure 7:
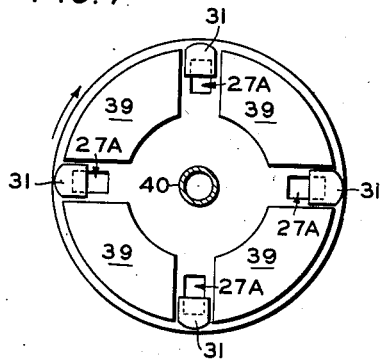
Figure 7 is an end view of the drum 11 of Figure 1 with the end plate 34 removed.

In the end wall 35 of the discharge end of the pellet mill are a number of openings 27 through which it is intended that carbon black pellets pass for removal from the pellet mill. Some slides 31, see Figure 7, are adapted to slide over a portion of the openings 27 to regulate the depth of the pellet bed. These slides are adapted to move radially between the end wall 35 and the end plate 34 and their movements are guided by some segment plates 39. The end plate 34 is rigidly attached to the downstream end of the tubular member 40 for support and is held thereby sufficiently close to the slide members 31 and segment members 39 that carbon black does not leak out between them. By movement of the slides 31 the effective openings 27A may be moved closer to or farther from the cylindrical side wall of the drum. When the openings 27A are farther away from the side wall the depth of the pellet bed in the mill is increased and similarly when the openings 27A are closer to the side wall the depth of the pellet bed in the mill is decreased.

A pellet receiving and dividing apparatus 20 is positioned at the low point at the outlet end of the pellet mill. This dividing apparatus is composed first of a screen 21 of very coarse mesh through which the pelleted product is to pass for removal of scale and large foreign objects. Such material passes from the dividing apparatus through an outlet 30 to such disposal or rerun after being pulverized as desired. The pelleted product which passes through the screen 21 passes through outlet 23 and is divided into two portions by dividing means 23A, one portion flowing through a tube 24 and the other portion through a spout 25. The pellets which pass through the tube 24 drop onto the belt conveyor 26, and the pellets which pass through spout 25 are termed product and may be transferred to storage or other disposal as desired. The outlet 23 of this dividing apparatus is equipped with a damper-like dividing means 23A or any other type of dividing means which will serve to divert a portion of the pellets through the tube 24 and another portion though the spout 25 and by adjustment of the dividing apparatus the pellets flowing through these two tubes may be proportioned as desired. A lid 22 keeps foreign matter from falling into the divider apparatus. The carbon black pellets passing to the conveyor 26 through tube 24 are elevated by the conveyor and discharged into a hopper 28 for passage through the tube or spout 29 which discharges the pellets into the inlet end of the pellet mill. Spout 29 is supported by a stationary plate 14 which is intended to close openings in the inlet end wall of the drum 11.

The rod 18, as mentioned hereinbefore, is supported by the two arms 33 and it is intended that this rod 18 be more or less rigid so that it will remain under the tube 40 in a fixed position at all times. When the mill is operating the carbon black pellets and charge of black to be pelleted cover this rod 18 and since the mill rotates there is a tendency to drag the rod along with the moving pellet bed. The rod 18 should be rigidly attached to the ends of the arms 33 and the upper ends of these arms should be rigidly attached to the under side of the tubular supporting member 40.

Figure 2 illustrates the positioning of the several vanes 32 with respect to the side wall of the pellet mill. The tubular member 40 is also shown in its central position and as a support for the arms 33. The open end 12 of the screw conveyor 13 may also be seen in this figure.

Figure 3 of the drawing illustrates the construction of a pellet mill adapted to be larger in size than the pellet mill of Figure 1, and accordingly having a much greater capacity. This mill consists of a cylindrical shell 11A having vane members 32A rigidly attached to the inner cylindrical walls. This mill, for example, may be 48 feet in length and 6 feet inside diameter. In such a mill are four vane members 32A which are 32 feet in length and 4 inches in height, one end of the vanes being placed about 6 feet from the inlet end of the mill and the other end of the vanes 10 feet from the outlet end of the mill. This mill is equipped with a feed apparatus consisting of three screw conveyors illustrated in Figure 3 by reference numerals 50, 51 and 52. Screw conveyor 50 has its discharge end 60 fully open so that all the carbon black passing through the screw 50 will fall out the open end 60 as feed to the pellet mill. In like manner the conveyor 51 has its outlet end 61 fully open so that all the black passing through this conveyor will fall out the open end 61 as additional feed to the mill and also the conveyor 52 has its outlet end 62 fully open so that the black passing through this conveyor will fall out the open end 62 into the mill at a point some distance from the inlet end of the mill. We have found that when using three separate feed conveyors, each discharging black at a different point in the mill, a positive feed condition is achieved. The feed end of the pellet mill which does not contain vanes as mentioned hereinbefore, is 6 feet in length and this portion of the 6 foot diameter mill was not equipped with a rod such as rod 18 of Figure 1. We have found that the use of a rod in this section of this large mill is too vigorous in its shearing action toward the bed of carbon black pellets and tends to produce excessive breakage of the pellets.

The portion of this mill downstream from the vanes is a 10 foot section in which there may be two scrapers 47. If desired, these scrapers may be constructed as one scraper but scrapers appear to function better and last longer if they are made in relatively short sections, and especially so if the cylindrical body of the mill 11A is composed of short sections. One scraper may be 6 feet in length and the other one about 4 feet in length in this 10 foot mill section. These scrapers may be made of equal lengths, if desired, or the end scraper may be 6 feet in length to conform with a 6 foot section of the drum.

Figure 4:
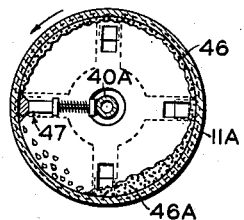
Figure 4 is a cross sectional view of the apparatus shown in Figure 3 and taken on the line 4—4 of the same looking in the direction indicated and showing one means for scale removal.
Figure 5:
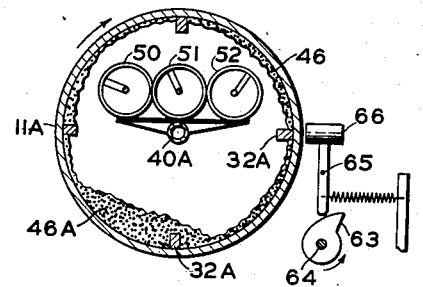
Figure 5 is a cross sectional view of the apparatus shown in Figure 3 and taken on the line 4—4 of the same looking in the direction indicated and showing another means for scale removal.
Figure 6:
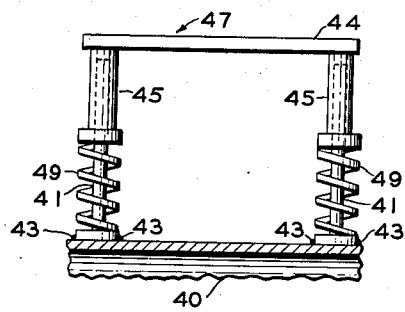
Figure 6 shows in plan the scraper means illustrated in Figures 3 and 4.

The mill may be constructed of sections of any desired length, for example, 6 feet, and of course dimensions of this nature are more or less immaterial and may be decided upon for structural reasons. The scrapers 47 of Figures 3, 4 and 6 are similar to the scrapers 47 of Figures 1 and 2. In Figure 3 a tubular support member 40A is supported by some support means, not shown, in such a manner that it does not rotate when the mill rotates. To this rigid supporting tube 40A may be welded at points 43 two arms 41 for each scraper. The arms 41 have some springs 49, see Figure 6. Surrounding one end of the arms 41 are some sleeves 45, as shown. These sleeves 45 support rigidly the scraper 44. The springs 49 are compression springs and are intended to hold the scraper 44 in close proximity to the wall of the drum so that as the drum rotates the scraper 44 will function to remove scale from the wall of the drum. Around a portion of the interior periphery of the mill is shown in Figures 3, 4 and 5, adhering carbon black scale 46, and in the bottom a bed of pellets and loosened scale 46A.

The use of these scrapers is alternative since in their place we may use a hammer system for dislodging the scale from the side wall of the pellet mill. Such a hammer system is illustrated in Figure 5. A hammer 66 which is pivoted at 65 is operated by a cam mechanism 63 to beat the outer wall of the mill. A long pellet mill may have from 1 to 20 or more of these hammers for scale removal but from 6 to 10 hammers are preferred. The several hammers may be mounted on individual pivots 65 or on a common shaft and are operated by cams 63. The hammers need not necessarily act in unison, preferably they do not. If desired, the several cams 63 may be mounted on a common shaft 64 at different positionings on the shaft so that upon one full revolution of the cam shaft 64 all of the hammers 66 will have struck the pellet mill. The hammers may be spring loaded as illustrated, and adapted to strike the mill when released by the cam 63. We have found that by using six, eight or even ten hammers of this nature that we have been able to keep a 6 foot by 48 foot pellet mill reasonably free from adhering scale on the interior surface. In Figure 5, only one hammer and one cam are shown. One advantage in use of exterior hammers over the use of scrapers in a mill is the less likelihood of broken pieces of metal finding their way into the pellet bed. If preferred, the hammers may be used along sections of a mill having vanes 32 or 32A and scrapers 47 in sections of a mill not equipped with vanes, or hammers may be used exclusively for scale removal.

In the operation of the pellet mill illustrated in Figure 1 of the drawing the mill may be charged with a load of carbon black pellets to about a normal operating depth in the mill. The slides 31 should be so adjusted that the depth of the pellet bed in the mill is that desired for optimum operation. Upon rotation of the mill pellets will flow through the outlet openings 27A into the divider 20 and in that apparatus some will pass through spout 25 as product while the remainder will pass through the pipe 24 for passage up the conveyor 26 to be dumped into hopper 28 and introduction through spout 29 into the inlet end of the mill as recycle pellets. After this operation is established raw flocculent chain structure black may then be added by the screw conveyor 13 into the inlet end of the mill. We have found that by operating the mill of Figure 1 at a speed of 28 R. P. M. that reasonably satisfactory pellets were produced. We have made pellets in a mill of this size, that is, 20 inches in diameter by 99 inches in length without the vanes 32. These pellets, however, were relatively large and tended to break rather easily upon handling. We then installed the rod 18, as hereinbefore explained, and upon operation of this mill pellets likewise were formed but these pellets on an average were somewhat smaller than the pellets made in the mill without the rod and the pellets so made appeared to be resistant to breakage on handling. We further found that upon installation of four vanes as illustrated in Figure 1 that the pellets made with the vanes (without the rod) were considerably smaller than the pellets made with only the rod in the pellet mill. These pellets likewise were more resistant to breakage in handling than those made without use of the vanes. Another test was made in which the rod 18 and the vanes 32 were used in the mill and we found that the pellets so made were still smaller than any made heretofore and were more resistant to breakage.

The operation of the pellet mill of Figure 3 is substantially the same as the operation of the mill illustrated in Figure 1. The mill of Figure 3 will be equipped with the outlet apparatus and pellet bed adjustment apparatus, pellet product dividing apparatus, and belt conveyor apparatus similar to those respective parts of Figure 1. These several members are not shown in the drawing of Figure 3 merely for purposes of simplicity, such a showing would merely be repetition. To start such an apparatus as illustrated in Figure 3, the mill would be charged with pellets, the mill rotated and all adjustments made so that pellets would be discharged and divided, some passing to storage and others passing to recycle. Raw flocculent chain structure black may then be fed into the mill through the three screw conveyors 50, 51 and 52 and the mill is then in operation.

To illustrate the operation of the pellet mill of our invention, the following examples are given to show the effect of the rod 18 and vanes 32 on the size of the carbon black pellets produced. In the accompanying table the four runs described were made in the pellet mill of Figure 1.

| Product Screen Size | Run No. 1 Mill | Run No. 2 With Rod | Run No. 3 With Vanes | Run No. 4 With Rod and Vanes |
| --- | --- | --- | --- | --- |
| | Wt. percent | Wt. percent | Wt. percent | Wt. percent |
| +10 mesh | 7.0 | 11.0 | 1.0 | 0.3 |
| −10+18 mesh | 57.0 | 46.7 | 18.3 | 1.6 |
| −18+35 mesh | 29.5 | 37.0 | 47.5 | 32.1 |
| −35+60 mesh | 4.1 | 3.7 | 29.3 | 59.2 |
| −60+120 mesh | 1.2 | 1.1 | 2.9 | 5.6 |
| −120 mesh | 1.2 | 0.5 | 1.0 | 1.2 |

(The "−" mark means "less than" and the "+" mark means "greater than" in the above table.)

The mill was operated at 28 R. P. M., twenty pounds of flocculent chain structure black were fed into the mill per hour and the pellet recycle rate was ten pounds per hour. Thus, the total charge to the mill per hour was thirty pounds. The slides 31 were adjusted to give a pellet bed depth of 6 inches. The rod 18 in this case was 34 inches long and the results given in the table for run No. 2 were made with the use of a rod only. The pelleted product was screened on a 10 mesh screen and the material passing through a 10 mesh screen was further screened on an 18 mesh screen. The under size from this screen was treated on a 35 mesh screen, the under size being further treated on a 60 mesh screen and under size material from this latter screen was further treated on a 120 mesh screen. Upon reference to the run No. 2 data in the table it will be observed that 46.7 weight per cent of the product was between 10 and 18 mesh in size and 37 per cent was between 18 and 35 mesh. Only a very small percentage, that is, 5.3 per cent passed through the 35 mesh screen and of course this amount was distributed among the three smaller sizes. Run No. 3 was made with this same mill after removal of the rod 18 and with the four 24-inch long vanes positioned as illustrated in Figures 1 and 2. The other operating conditions as regards R. P. M., feed, and recycle were all the same as in run No. 2. From the inspection of data of run No. 3 the production between 18 and 35 constituted nearly half, or 47.5 per cent of the pelleted sample. In run No. 2 with the rod only nearly half of the pelleted sample was between 10 and 18 mesh in size.

Run No. 4 was made with the same pellet mill and under the same operating conditions but both the rod and the vanes were used and the size distribution figures for run No. 4 will bear out that the average pellet size was still smaller, 59.2 per cent of the pelleted product being between 35 and 60 mesh in size. Only a minor percentage was smaller than 60 mesh. From another point of view 91.3 per cent of these pellets were between 18 and 60 mesh in size, which type of product is a very excellent type of pellet. In contrast to these three runs, Nos. 2, 3 and 4, with the use of the rod, the vanes, and the rod and the vanes, run No. 1 was made with the same mill but with neither the rod nor the vanes. Operating conditions were otherwise the same. From the size distribution of the pelleted product, it will be observed that 57 weight per cent of the pelleted product was between 10 and 18 mesh and 86.5 per cent was between 10 and 35 mesh in size. With such a large proportion of a pelleted product lying between 10 and 18 mesh breakage during handling and bulk transportation is excessive, since large size pellets are, in general, more fragile than small pellets. The use of the rod and vanes of our invention in the pellet mill is to disturb equilibrium in the pellet bed and thereby make smaller but harder pellets. These small pellets are not merely fragments or broken pieces of larger pellets, but are fully developed, generally spherical pellets.

By the terms "controlled cascading," or "controlled cascading action" is meant that interference with the normal, free-flowing or cascading of the carbon black aggregates as caused by the presence of the rod 18 and one or more vanes 32 in the bed of black.

We have found that the use of the rod 18 in a pellet mill caused production of pellets of some smaller average size (run No. 2), the use of vanes alone gave still smaller pellets (run No. 3) and by using both rod and vanes still smaller pellets were produced (run No. 4).

In run No. 1, with no vanes nor rods, 57 per cent of the black was between 10 and 18 mesh size, 29.5 per cent was between 18 and 35 mesh and only 4.1 per cent was between 35 and 60 mesh. This latter size is a very desirable size of pellets since they are comparatively strong and resist breakage to a marked degree.

In run No. 2, more 18 to 35 mesh pellets were formed at the expense of the 10 to 18 mesh size than in run No. 1. The 35 to 60 mesh product was about the same. However, in runs Nos. 3 and 4 it is seen that the coarser sizes became progressively smaller in quantity and in run No. 4 the 35 to 60 mesh constitute 59.2 per cent of the pelleted product. Such a product is most desirable.

It was the shearing action or the interference of the vanes and/or rod with the free cascading of the bed of black that finally yielded rounded pellets of a most desirable size. A rod, such as rod 18, is less vigorous in its action than is a group of vanes, such as vanes 32 or 32A.

The disclosed apparatus is a specific means with which to practice the process of our invention and accordingly to accomplish the objects herein set forth. The carbon black bed disturbing means may be of various shapes. The preferred shape is a vane or rib, as herein described, or an angle iron, attached rigidly to the inner wall of the drum and parallel to the axis about which the drum rotates. These vanes, ribs or angle irons are of such size and are usually so installed as to extend radially and inward an appreciable distance from the wall of the drum. Other shapes may be used such as rods or tubes of circular or elliptical cross section, half circles, half ellipses, or angle irons so arranged that the 90 degree angle points toward the center of drum rotation. A vane or rib may be positioned non-radially, that is, at an angle less than 90° from the wall of the drum so that the acute angle points backward with respect to the direction of rotation of the drum.

From the number of shapes or forms of ribs which may be used, it is obvious that the equilibrium of the pellet bed may be disturbed by a plurality of like or unlike rib-like elements attached to the shell of the pellet mill.

The effective height or radial dimension of the bed disturbing elements is important and may even be more or less critical. The effective height desired will be determined by the degree of disturbance desired, the pellet bed depth, size of the mill, feed rate, etc. It is believed that the effective height should lie in the range of $\frac{1}{8}$ to $\frac{7}{8}$ of the pellet bed depth, and preferably in the range of $\frac{1}{4}$ to $\frac{3}{4}$ of the bed depth. The "effective height" is the distance from the drum wall radially to the highest part of the element.

The number of bed disturbing elements may also be determined largely by the pelleting job to be done and is at least in part dependent upon the bed depth, the effective height of the disturbing elements, feed rate, size of mill and other variables. There should be at least two elements spaced 180 degrees apart. With the elements spaced equidistantly around the circumference of the mill, the maximum number may be determined by the minimum allowable spacing, which may be taken as 4 inches. However, with elements having an effective height of $\frac{1}{8}$ to $\frac{1}{4}$ of the bed depth the spacing may approach the minimum while with element heights of $\frac{3}{4}$ to $\frac{7}{8}$ of the bed depth the number of elements may be in the range of 2 to 4. The preferred spacing in terms of inches may be from 10 to 60, the former being for low elements and the latter for high radial distance elements.

The vanes or bed disturbing elements may extend from the feed end of the mill to a point some distance upstream from the discharge end of the mill. The exact length of this downstream section of the mill having no vanes or ribs or other bed disturbing elements is not critical but it should be sufficiently long to permit compacting, hardening and polishing of the pellets following the final addition of flocculent black.

While I do not wish to be limited by any theory of how production of smaller than normal pellets occurs, perhaps the major pellet forming action in pelleting mill 11 with formation of the small pellets is due to shearing forces acting on the carbon black bed during cascading or tumbling of the pellets as modified by the vanes 32 or 32A, this cascading and shearing action being due to the action of gravity on the pellet bed. As the drum 11A of Figure 3 rotates clockwise the bed 46A builds up on the left side until the angle of repose of the pellets in said bed is exceeded. Then the upper portion of the pellets (not adhering to drum 11A) cascades or tumbles down the sloping bed 46A, this free cascading or tumbling is interfered with by the vanes 32A and shearing forces are at work.

For each size of mill of particular construction as regards diameter, length, number, shape and size of vanes, there will be a set of operating conditions such as mill speed, bed depth, feed rate, recycle rate, etc., which will produce pellets of a given average size, as long as all of the above-mentioned variables are maintained within operable limits. To produce pellets of a smaller average size it will merely be necessary to select a combination of mill design conditions and operating conditions which when operational equilibrium is established are such that shearing forces at work in the pellet bed are at an optimum. To increase the shearing forces mill speed may be increased, depth of pellet bed may be increased, vane height may be increased or the number of vanes or their length may likewise be increased. With high structure blacks such as Philblack A it will be found that shearing force may be increased by the above means until an optimum is reached and beyond this optimum shearing force the average size of the pellets will actually increase because the increased quantity of broken pellets cause pellets to grow in size. To produce a pelleted product of a desired average pellet size it is then merely necessary with a given mill to determine an equilibrium condition involving vanes, mill speed, bed depth and the like. One chain structure carbon black will require one set of operating conditions to produce pelleted product of a desired average size while another chain structure black may require different equilibrium conditions to produce a pelleted product of the same average size.

Materials of construction may be selected from among those commercially available since no special materials are required.

Those skilled in the art will readily appreciate that other mechanical devices may be designed which are substantially equivalent in function to the specific rod and/or vane combination described herein. The critical feature of our invention amounts to providing a means for disturbing a pellet bed in a dry process pellet mill in such a manner as to control the pellet breakage and growth and thus yield a product pellet of desired size.

Having disclosed our invention, we claim:

1. Apparatus for forming carbon black pellets of a predetermined average size from flocculent chain structure carbon black comprising an elongated hollow cylindrical drum having a nonperforate sidewall, horizontally disposed and adapted to rotate around its longitudinal axis as a center, means for introducing flocculent chain structure carbon black into one end of said drum, means for introducing pelleted chain structure carbon black into said one end of said drum, means for removing carbon black pellets from the other end of said drum, means for dividing said removed carbon black pellets into two unsized portions, means for returning one portion to said one end of said drum, and an elongated and stationary rod disposed parallel to and below the axis of the drum at a point near but not touching the sidewall thereof and extending from the inlet end wall to a point downstream thereof and below the normal bed surface of carbon black in said drum to plow through said bed and disturb the equilibrium thereof.

2. Apparatus for forming carbon black pellets of a predetermined average size from flocculent chain structure carbon black comprising an elongated hollow cylindrical drum having a nonperforate sidewall, horizontally disposed and adapted to rotate around its longitudinal axis as a center, means for introducing flocculent chain structure carbon black into one end of said drum, means for introducing pelleted chain structure carbon black into said one end of said drum, means for removing carbon black pellets from the other end of said drum, means for dividing said removed carbon black pellets into two portions without effecting any segregation according to size, means for returning one portion to said one end of said drum, an elongated non-rotatable rod disposed parallel to and below the axis of the drum at a point near but not touching the side wall thereof and extending from the inlet end wall to a point downstream thereof, and a plurality of elongated vane members disposed axially of said drum and rigidly at spaced intervals around the inner side wall thereof, the elongated vanes extending longitudinally downstream from the downstream end of said elongated rod and terminating at a point upstream from the outlet end wall of said drum.

MERTON L. STUDEBAKER.
JOHN E. CROUCH.

References Cited in the file of this patent

UNITED STATES PATENTS

| Number | Name | Date |
|---|---|---|
| 2,071,534 | Ingraham | Feb. 23, 1937 |
| 2,164,164 | Price | June 27, 1939 |
| 2,213,056 | Skoog et al. | Aug. 27, 1940 |
| 2,309,970 | McKinney | Feb. 2, 1943 |
| 2,311,154 | Carney | Feb. 16, 1943 |
| 2,422,989 | Skoog | Jan. 24, 1947 |
| 2,503,361 | Studebaker | Apr. 11, 1950 |

FOREIGN PATENTS

| Number | Country | Date |
|---|---|---|
| 544,274 | Great Britain | Apr. 3, 1942 |